(12) United States Patent
Akahane et al.

(10) Patent No.: US 12,446,616 B2
(45) Date of Patent: Oct. 21, 2025

(54) MANUFACTURING DEVICE AND MANUFACTURING METHOD FOR FILLER ELEMENT USED IN FLAVOR INHALATION ARTICLE

(71) Applicant: Japan Tobacco Inc., Tokyo (JP)

(72) Inventors: Takuya Akahane, Tokyo (JP); Kazumasa Arae, Tokyo (JP); Katsuo Kato, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 0 days.

(21) Appl. No.: 18/732,654

(22) Filed: Jun. 4, 2024

(65) Prior Publication Data

US 2024/0315321 A1    Sep. 26, 2024

Related U.S. Application Data (63) Continuation of application No. PCT/JP2021/045311, filed on Dec. 9, 2021.

(51) Int. Cl.
| | | |
|---|---|---|
| *A24D 3/00* | (2020.01) | |
| *A24D 1/00* | (2020.01) | |
| *A24D 1/04* | (2006.01) | |
| *A24D 1/20* | (2020.01) | |
| *A24D 3/02* | (2006.01) | |

(Continued)

(52) U.S. Cl.
CPC ............. *A24D 3/022* (2013.01); *A24D 1/002* (2013.01); *A24D 1/045* (2013.01); *A24D 1/20* (2020.01); *A24D 3/0229* (2013.01); *A24D 3/0254* (2013.01); *A24D 3/048* (2013.01); *A24D 3/10* (2013.01); *A24D 3/17* (2020.01); *B31F 1/22* (2013.01)

(58) Field of Classification Search
CPC . A24D 3/022; A24D 3/17; A24D 1/20; A24D 1/002; A24D 1/045; A24D 3/0229; A24D 3/0254; A24D 3/048; A24D 3/10; A24D 1/22; A24B 15/12; A24B 15/16; A24B 15/165; A24B 15/30
USPC ............................................ 493/49
See application file for complete search history.

(56) References Cited

U.S. PATENT DOCUMENTS

2014/0166032 A1* 6/2014 Gindrat ................... A24C 5/18
                                                   131/353
2018/0177228 A1   6/2018 Pijnenburg et al.
(Continued)

FOREIGN PATENT DOCUMENTS

| EP | 3170411 A1 | 5/2017 |
|---|---|---|
| JP | 2014-515274 A | 6/2014 |

(Continued)

OTHER PUBLICATIONS

Japanese Office Action issued Feb. 26, 2025 in corresponding Japanese Patent Application No. 2023-565799, 8 pages.

(Continued)

*Primary Examiner* — Jacob A Smith
(74) *Attorney, Agent, or Firm* — XSENSUS LLP (57) ABSTRACT

A manufacturing device for a filler element includes a sheet processing section forms a crimped part on a sheet and a feed portion that continuously feeds an additive dropwise onto an upper face of the sheet having the crimped part. The feed portion includes a multiple nozzle in which a large number of feed outlets feeding the additive are arranged in the width direction.

9 Claims, 9 Drawing Sheets

(51) Int. Cl.
    *A24D 3/04*    (2006.01)
    *A24D 3/10*    (2006.01)
    *A24D 3/17*    (2020.01)
    *B31F 1/22*    (2006.01)

(56) References Cited

U.S. PATENT DOCUMENTS

2018/0199616 A1* 7/2018 Gindrat .................. A24B 15/12
2022/0151286 A1* 5/2022 Gindrat .................. A24F 40/20

FOREIGN PATENT DOCUMENTS

| JP | 2017-524368 A | 8/2017 |
| JP | 6198951 B2 | 9/2017 |
| JP | 6950118 B1 | 10/2021 |
| WO | 2016/009555 A1 | 1/2016 |

OTHER PUBLICATIONS

International Search Report and Written Opinion mailed on Feb. 15, 2022, received for PCT Application No. PCT/JP2021/045311, filed on Dec. 9, 2021, 9 pages including English Translation.
Japanese Office Action issued Jun. 17, 2025 in corresponding Japanese Patent Application No. 2023-565799, 5 pages.

* cited by examiner

|  | TYPE OF NOZZLE | CRIMPED DEPTH (mm) | ADHESION OF ADDITIVE TO CATCHER DRUM | VARIATION IN AMOUNT ADDED |
|---|---|---|---|---|
| PRACTICAL EXAMPLE 1 | MULTIPLE | 0.1 | FAIR | GOOD |
| PRACTICAL EXAMPLE 2 | MULTIPLE | 0.3 | GOOD | GOOD |
| PRACTICAL EXAMPLE 3 | MULTIPLE | 1.0 | GOOD | FAIR |
| COMPARATIVE EXAMPLE 1 | SINGLE | 0.3 | POOR | FAIR |
| COMPARATIVE EXAMPLE 2 | MULTIPLE | 0 | POOR | GOOD |
| COMPARATIVE EXAMPLE 3 | MULTIPLE | 1.2 | GOOD | POOR |

FIG. 17

MANUFACTURING DEVICE AND MANUFACTURING METHOD FOR FILLER ELEMENT USED IN FLAVOR INHALATION ARTICLE

CROSS-REFERENCE TO RELATED APPLICATION

This application is a continuation of International Application No. PCT/JP2021/045311, filed on Dec. 9, 2021, the entire content of which is incorporated herein by reference.

TECHNICAL FIELD

The present invention relates to manufacturing devices and manufacturing methods for filler elements used in flavor inhalation articles.

BACKGROUND ART

Patent Literature 1 discloses a filter manufacturing apparatus including a coating device and a shaping unit. The coating device has a feed portion that continuously drops a liquid additive onto an upper surface of a strip-like filter textile conveyed along a conveyance path. The shaping unit shapes the filter textile into a rod shape at the downstream side of the coating device in the conveyance path. The feed portion has coating nozzles each having a coating outlet for dropping the additive. The plurality of coating nozzles are arranged to form a row in the width direction of the conveyance path.

CITATION LIST

Patent Literature

PTL 1: Japanese Patent No. 6198951

SUMMARY OF INVENTION

Technical Problem

A filter material described in Patent Literature 1 is a filter textile that has a flat upper surface and that is formed by shaping acetate tow composed of cellulose acetate into a strip shape. Therefore, if a relatively large amount of additive is to be added, the additive dropped to a part of the upper surface of the filter textile may be unevenly distributed. If the unevenly distributed additive exceeds the absorption limit of the filter textile, the additive may spill by traveling between the fibers of the filter textile, sometimes making it impossible to add a desired amount of additive to the filter.

Furthermore, the spilled additive may possibly contaminate equipment. Moreover, the uneven distribution of the additive dropped on the upper surface of the filter textile may make it impossible to uniformly add the additive onto the entire upper surface of the filter textile. Therefore, a flavor inhalation article may vary in smoke taste, thus making it impossible to ensure the quality of the flavor inhalation article. Hence, for the filter material, it is conceivable to use a material other than acetate tow.

By adding a flavoring agent to the filter, it is conceivable to consider that the filter serves as a filler element having a flavor producing function other than a filtering function. However, Patent Literature 1 does not have any special consideration about using a filter material other than acetate tow or treating the filter as various filler elements constituting the flavor inhalation article.

The present invention has been made in view of such problems, and an object thereof is to provide a manufacturing device and a manufacturing method for a filler element that enables uniform addition of a liquid additive without spilling and that can be used as various elements of a flavor inhalation article.

Solution to Problem

In order to achieve the aforementioned object, a manufacturing device for a filler element according to an aspect is a device for manufacturing a filler element used in a flavor inhalation article. The manufacturing device for the filler element comprises: a sheet processing section that processes a series of sheets while conveying each sheet along a conveyance path; an addition section that feeds a liquid additive onto an upper surface of the sheet processed at the sheet processing section; a gathering section that forms a gathering rod during a conveying process of the sheet along the conveyance path, the gathering rod being reduced in diameter by gathering the sheet, to which the additive is added at the addition section, in a width direction intersecting with a longitudinal direction of the sheet; a wrapping section that wraps the gathering rod, formed at the gathering section, with wrapping paper to form a filler rod; and a cutting section that cuts the filler rod, formed at the wrapping section, into an intermediate rod having a combined length of a plurality of the filler elements. The sheet processing section forms a crimped part in the sheet during the conveying process of the sheet, the crimped part being arranged in the width direction and extending in the longitudinal direction. The addition section has a feed portion that continuously feeds the additive dropwise onto the upper surface of the sheet, having the crimped part formed therein, during the conveying process of the sheet. The feed portion has a multiple nozzle having a plurality of feed outlets arranged in the width direction, the feed outlets feeding the additive.

A manufacturing method for a filler element according to an embodiment is a method for manufacturing a filler element used in a flavor inhalation article. The manufacturing method for the filler element comprises: a sheet processing step for processing a series of sheets while conveying each sheet along a conveyance path; an addition step for feeding a liquid additive onto an upper surface of the sheet processed in the sheet processing step; a gathering step for forming a gathering rod during a conveying process of the sheet along the conveyance path, the gathering rod being reduced in diameter by gathering the sheet, to which the additive is added in the addition step, in a width direction intersecting with a longitudinal direction of the sheet; a wrapping step for wrapping the gathering rod, formed in the gathering step, with wrapping paper to form a filler rod; and a cutting step for cutting the filler rod, formed in the wrapping step, into an intermediate rod having a combined length of a plurality of the filler elements. The sheet processing step includes performing a crimping process for forming a crimped part in the sheet during the conveying process of the sheet, the crimped part being arranged in the width direction and extending in the longitudinal direction. The addition step includes feeding the additive continuously and dropwise onto the upper surface of the sheet, having the crimped part formed therein, entirely in the width direction of the sheet during the conveying process of the sheet.

Advantageous Effects of Invention

A filler element that enables uniform addition of a liquid additive to the filler element without spilling and that can be used as various elements of a flavor inhalation article can be provided.

DESCRIPTION OF EMBODIMENTS

Figure 1:
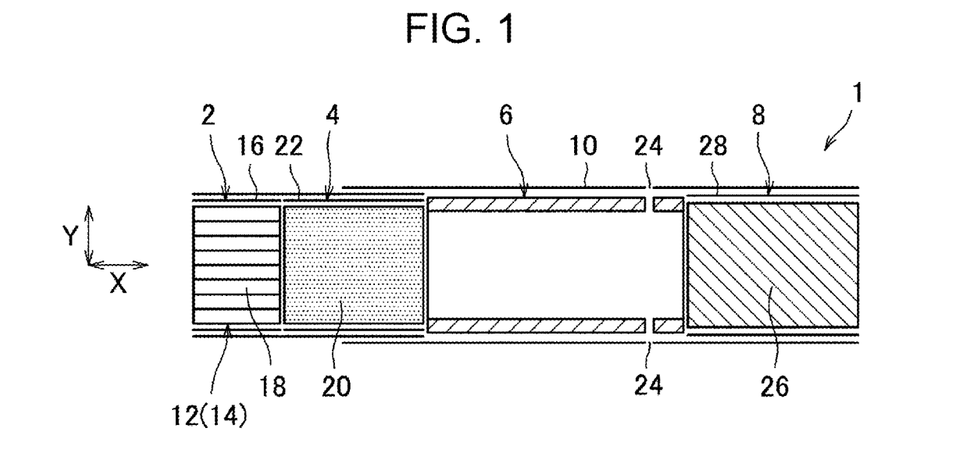
FIG. 1 is a cross-sectional view of a flavor inhalation article.

FIG. 1 illustrates a cross-sectional view of a flavor inhalation article 1 (also referred to as "article" hereinafter) of a non-combustion heating type. The article 1 is constituted of a filler element 2, a flavor element 4, a tubular element 6, and a filter 8. The elements 2, 4, 6, and 8 are arranged in abutment with each other in this order in an axial direction X and are wrapped with tipping paper 10, whereby the article 1 is formed. The filler element 2 is formed by wrapping a sheet filler section 14 with wrapping paper 16. The sheet filler section 14 is reduced in diameter by gathering, that is, putting together, a single sheet 12 in a width direction Y (which is partially the same direction as a radial direction of the filler element 2) intersecting with a longitudinal direction X (which is the same direction as the axial direction of the filler element 2) of the sheet 12.

The sheet 12 has formed therein a predetermined number of recessed crimped parts 18 arranged in the width direction Y and extending in the longitudinal direction X. The flavor element 4 is formed by wrapping a flavor material 20 with wrapping paper 22. The flavor element 4 is heated by a heater of a device (flavor inhalation device) (not shown) when the article 1 is being used, whereby a flavor component of the flavor material 20 vaporizes. The flavor material 20 may be mixed with a conductive member, such as a metallic plate or metallic particles (not shown). In this case, the device generates a magnetic field in accordance with the existence of the conductive member, and the flavor material 20 is heated by an induced current of the magnetic field.

The flavor material 20 is an item obtained by folding, for example, shredded tobacco, a shredded tobacco-sheet item, or a tobacco sheet in a gathered manner. The flavor material 20 may be an item obtained by adding a flavor to a sheet made from non-tobacco-containing pulp, an item obtained by shredding a sheet made from a non-tobacco plant, or an item obtained by folding these sheets in a corrugated manner. The tubular element 6 is, for example, a cylindrical paper tube formed of a single-layered or double-layered paper web, and forms an airflow path in the article 1.

The peripheral surface of the tubular element 6 is provided with a plurality of ventilation holes 24 for introducing air into the article 1 during inhalation of the article 1. During inhalation of the article 1, air is introduced into the article 1 from the outside via the ventilation holes 24. The flavor component vaporized from the flavor element 4 becomes an aerosol by being cooled by the introduced air, and a user inhales the aerosol that has passed through the filter 8. The filter 8 is a filter body formed by wrapping a filter material 26, such as acetate tow, with wrapping paper 28.

Figure 2:
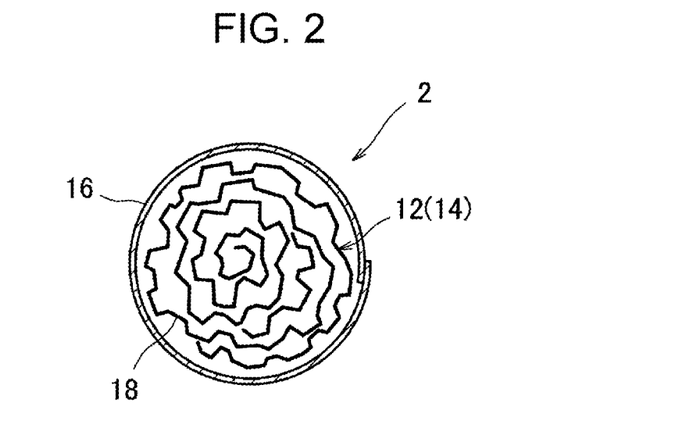
FIG. 2 is a vertical sectional view of a filler element.

FIG. 2 illustrates a vertical sectional view of the filler element 2. The sheet 12 may be a paper web or may be a nonwoven fabric. If the sheet 12 is a nonwoven fabric, the sheet 12 is preferably a dry nonwoven fabric in which plant pulp is adhered together using a water soluble binder. The plant pulp used may be wood pulp, which is a non-tobacco plant. A liquid additive is uniformly added to the sheet filler section in the radial direction Y and the axial direction X thereof.

The additive is heated together with the flavor element 4 by the heater of the device, so that a component of the additive vaporizes. The additive is, for example, a flavor liquid and may contain a tobacco extract liquid. Because the filler element 2 is positioned at the distal end of the article 1, the filler element 2 functions as a so-called support segment that suppresses spilling of the flavor material 20 from the flavor element 4. In a case where a blade-like or pin-type heater is inserted into the filler element 2 and the flavor element 4 to heat the filler element 2 and the flavor element 4 from the inside, contamination of the device caused by spilling of the flavor material 20 is suppressed.

Figure 3:
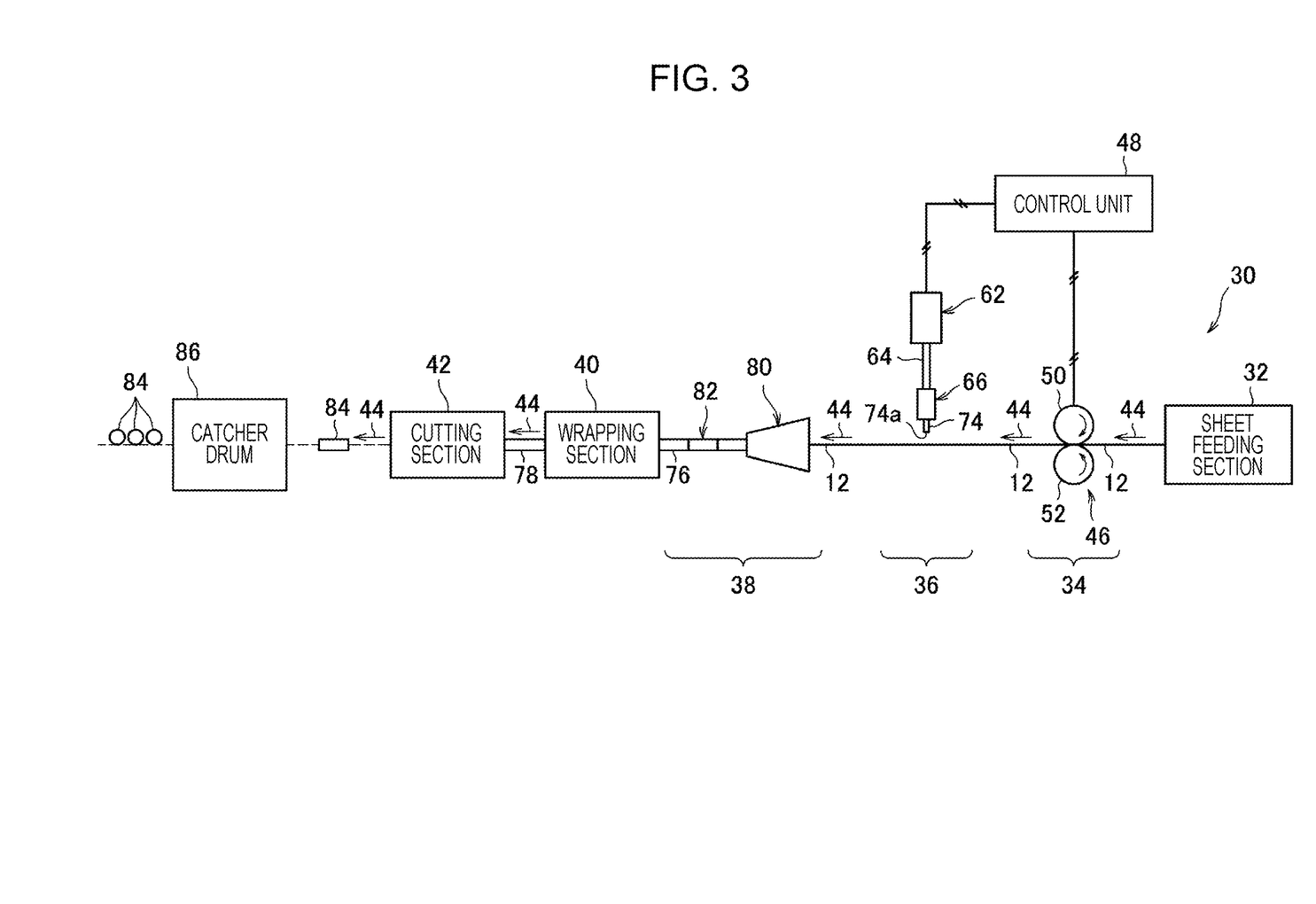
FIG. 3 is a schematic diagram of a manufacturing device for the filler element.
Figure 4:
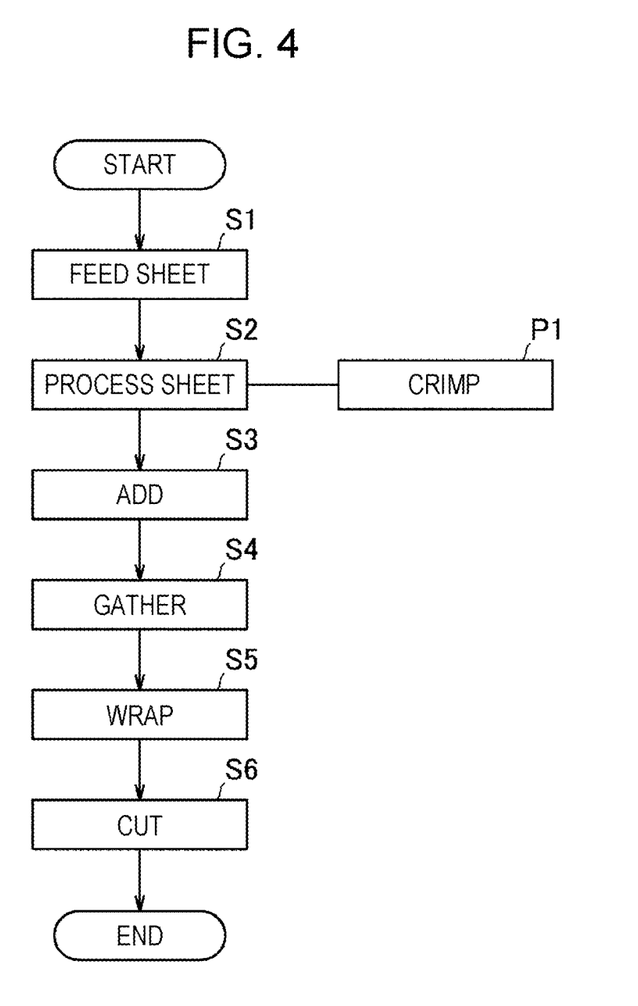
FIG. 4 is a flowchart explaining a manufacturing method for the filler element.

FIG. 3 illustrates a schematic diagram of a manufacturing device 30 for the filler element 2, and FIG. 4 illustrates a flowchart explaining a manufacturing method for the filler element 2. The manufacturing device 30 includes a sheet feeding section 32, a sheet processing section 34, an addition section 36, a gathering section 38, a wrapping section 40, and a cutting section 42. When the manufacturing of the filler element 2 starts, the sheet feeding section 32 feeds a series of sheets 12 to a conveyance path 44 (S1: sheet feeding step).

Subsequently, the sheet processing section 34 processes each sheet 12 while conveying the sheet 12 along the conveyance path 44 (S2: sheet processing step). The sheet processing section 34 includes a roller set 46 and a control unit 48. The roller set 46 is constituted of a first roller 50 and a second roller 52. The first and second rollers 50 and 52 nip and convey the sheet 12 along the conveyance path 44.

A rotation shaft of at least one of the first and second rollers 50 and 52 is coupled to a drive shaft of a motor (not shown), and is rotationally driven by the motor. The motor is electrically connected to the control unit 48. The rotation speed of each of the first and second rollers 50 and 52 is controlled via the motor based on a signal from the control unit 48.

Figure 5:
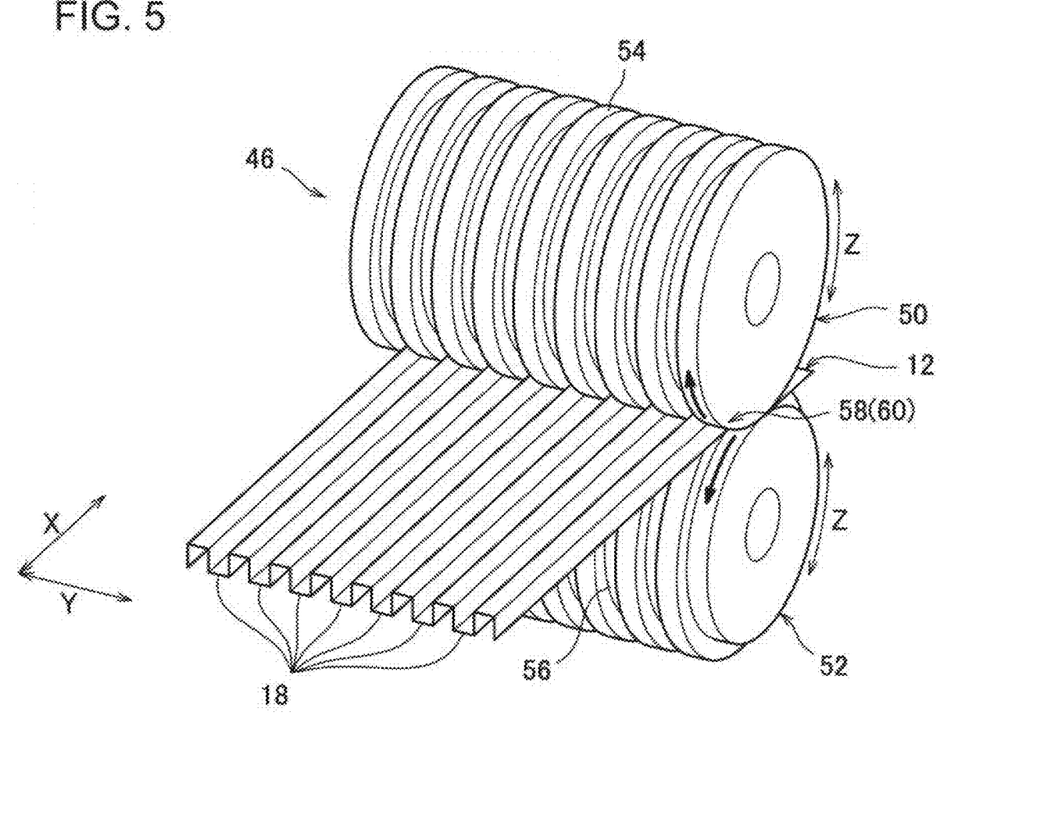
FIG. 5 is a perspective view of a roller set nipping a sheet.

FIG. 5 illustrates a perspective view of the roller set 46 nipping the sheet 12. The first roller 50 is provided with protrusions (projections) 54 protruding along a circumferential direction Z of the outer peripheral surface of the first roller 50. The second roller 52 is provided with recesses (depressions) 56 engaging with the protrusions 54 along the circumferential direction Z of the outer peripheral surface of the second roller 52. When the roller set 46 nips and conveys the sheet 12, the first and second rollers 50 and 52 rotate in directions of arrows indicated in FIG. 5, so that the protrusions 54 and the recesses 56 engage with each other with the sheet 12 interposed therebetween, whereby engagement parts 58 are formed in the roller set 46.

In the roller set 46, an engagement area 60 provided with a predetermined number of engagement parts 58 is formed in an area extending in the circumferential direction Z of each of the outer peripheral surfaces of the first and second rollers 50 and 52. The engagement area 60 causes the engagement parts 58 to give a crimping treatment to an area extending in the longitudinal direction X of the sheet 12. Accordingly, a predetermined number of crimped parts 18 corresponding to the number of engagement parts 58 are formed in the sheet 12 (P1: crimping process). A crimping treatment is a creping process involving forming protrusions and recesses on the sheet 12 at a pitch. The crimped parts 18 are fine creases protruding or recessed from the sheet 12, and are defined as depressions recessed in various shapes or projections protruding in various shapes relative to the flat surface of the sheet 12.

Figure 6:
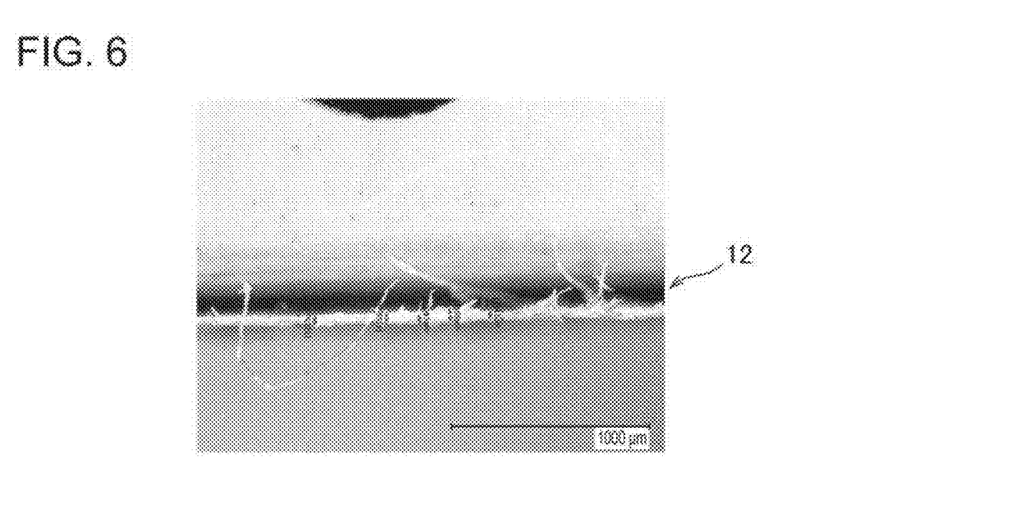
FIG. 6 illustrates an enlarged captured image of a cross section of the sheet prior to a crimping treatment.
Figure 7:
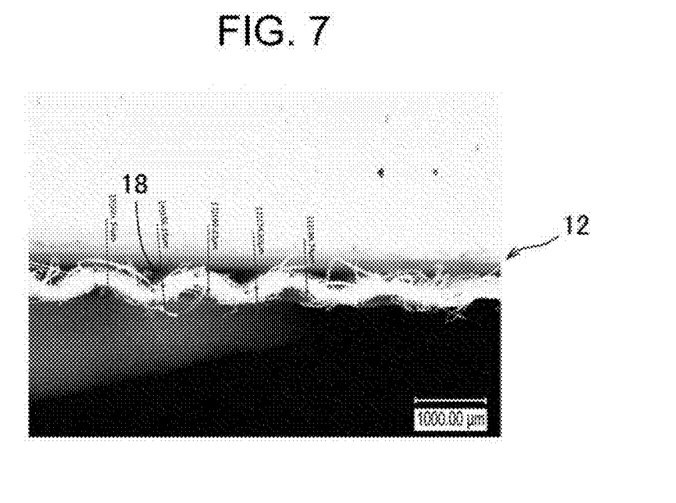
FIG. 7 illustrates an enlarged captured image of the cross section of the sheet after the crimping treatment (crimped depth: 0.3 mm).
Figure 8:
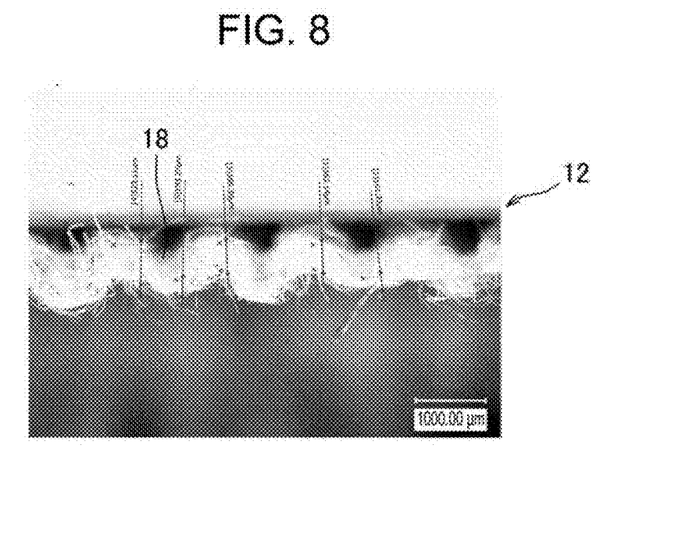
FIG. 8 illustrates an enlarged captured image of the cross section of the sheet after the crimping treatment (crimped depth: 1.0 mm).

FIG. 6 illustrates an enlarged captured image of a cross section of the sheet 12 prior to the crimping treatment, and FIG. 7 illustrates an enlarged captured image of the cross section of the sheet 12 after the crimping treatment. FIG. 8 illustrates an enlarged captured image of the cross section of the sheet 12 when the depth (crimped depth) of the crimped parts 18 is increased relative to the case in FIG. 7. Because the sheet 12 is web-like, fibers intertwined with each other in the sheet 12 have become partially fuzzy even in the state prior to the crimping treatment shown in FIG. 6.

When the crimped parts 18 with a crimped depth of 0.3 mm are formed in the sheet 12, the fibers of the sheet 12 are stretched and defibrated, so that the fuzzing of the sheet 12 becomes more noticeable, as shown in FIG. 7. Furthermore, when the crimped parts 18 with a crimped depth of 1.0 mm are formed in the sheet 12, the stretching, defibration, and fuzzing of the sheet 12 become even more noticeable, as shown in FIG. 8. The crimped parts 18 formed in the sheet 12 and the fiber stretching, defibration, and fuzzing occurring with the formation of the crimped parts 18 cause the surface area of the sheet 12 to increase.

Figure 9:
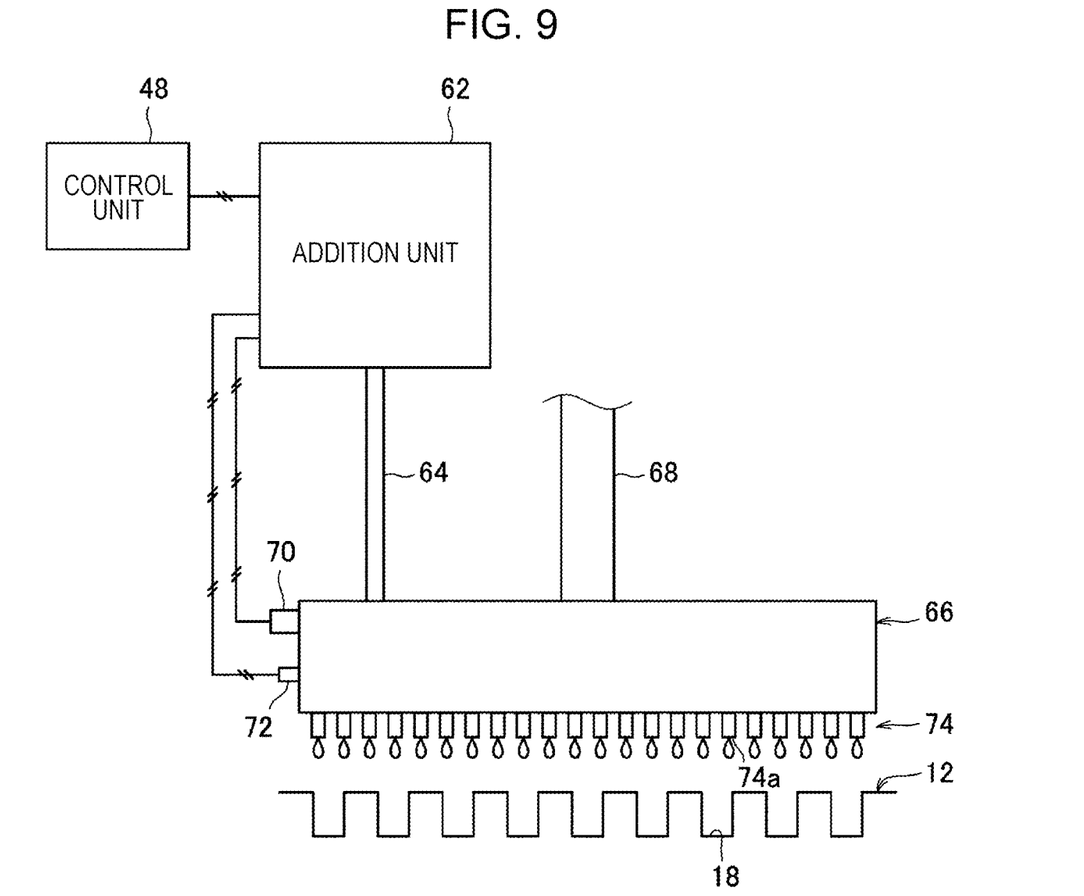
FIG. 9 is a schematic diagram of an addition section, as viewed from the front surface in the conveying direction of the sheet.

FIG. 9 illustrates a schematic diagram of the addition section 36, as viewed from the front surface in the conveying direction of the sheet 12. The addition section 36 feeds the liquid additive onto the upper surface of the sheet 12 processed at the sheet processing section 34 (S3: addition step). The addition section 36 includes an addition unit 62 storing the additive therein, and also includes a feed portion 66 connected to the addition unit 62 via a feed pipe 64. The addition unit 62 feeds the additive to the feed portion 66.

The feed portion 66 is supported by a support bracket 68, and a heater 70 and a temperature sensor 72 are attached to the feed portion 66. The heater 70 and the temperature sensor 72 are electrically connected to the addition unit 62. The addition unit 62 causes the heater 70 to heat the feed portion 66 to a fixed temperature based on the temperature of the feed portion 66 detected by the temperature sensor 72. Accordingly, fixation of the additive in the feed portion 66 is prevented.

Figure 10:
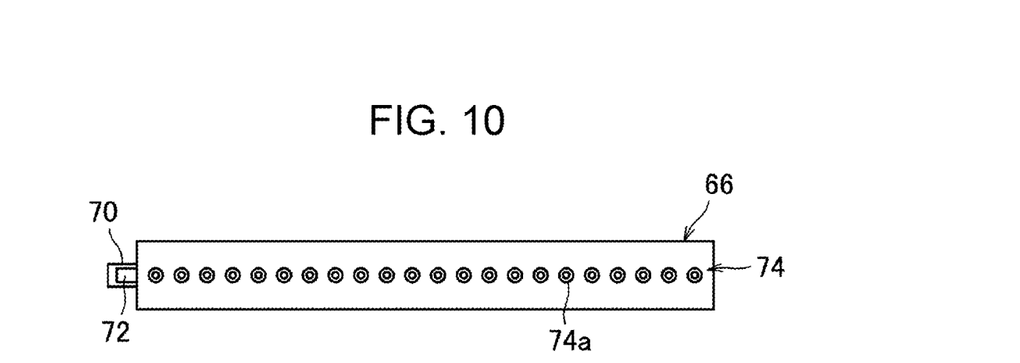
FIG. 10 is a bottom view of a feed portion 66 in FIG. 9.

FIG. 10 illustrates a bottom view of the feed portion 66. The feed portion 66 has a multiple nozzle 74 in which a large number of feed outlets 74a feeding the additive are arranged in the width direction Y. The feed outlets 74a are arranged in a single row at a pitch of, for example, 5 mm. As shown in FIG. 9, in the conveying process of the sheet 12, the feed portion 66 feeds the additive continuously from the feed outlets 74a of the multiple nozzle 74 onto the upper surface of the sheet 12 having the crimped parts 18 formed therein and also feeds the additive dropwise over the entire upper surface of the sheet 12 in the width direction Y.

As mentioned above, the crimped parts 18 formed in the sheet 12 and the fiber stretching, defibration, and fuzzing occurring with the formation of the crimped parts 18 cause the surface area of the sheet 12 to increase. Therefore, the crimped parts 18 formed in the sheet 12 cause the absorbability of the liquid additive into the sheet 12 to significantly increase. Accordingly, a large amount of additive can be added uniformly over the entire sheet 12 without spilling. In detail, the additive that is greater than or equal to 20 mg/cm$^3$ per unit volume of a filler rod 78, to be described later, can be added to the sheet 12.

The addition unit 62 may be electrically connected to the control unit 48. In this case, the roller set 46 and the addition unit 62 can be controlled in cooperation with each other via the control unit 48. The addition unit 62 feeds the additive by an amount corresponding to the rotation speed of each of the first and second rollers 50 and 52, that is, an amount corresponding to the conveying speed of the sheet 12, to the multiple nozzle 74 via the feed pipe 64. Accordingly, a desired amount of additive can be added readily to the sheet 12, and by extension the filler rod 78.

As shown in FIG. 3 and FIG. 4, in the conveying process of the sheet 12 along the conveyance path 44, the gathering section 38 forms the gathering rod 76 reduced in diameter by gathering the sheet 12, with the additive added thereto at the addition section 36, in the width direction Y (S4: gathering step). The gathering rod 76 is shaped into the filler rod 78 in a subsequent step, and further becomes the sheet filler section 14 when the filler element 2 is formed.

Specifically, the gathering section 38 includes a trumpet guide 80 and a tongue 82 in that order from the upstream side of the conveyance path 44 in the conveying direction. The trumpet guide 80 and the tongue 82 are both tubular. The trumpet guide 80 has an inner peripheral surface that gradually decreases in diameter from the upstream side of the conveyance path 44. The trumpet guide 80 randomly gathers the sheet 12 conveyed along the conveyance path 44 while reducing the diameter of the sheet 12 into a rod shape, and releases the sheet 12 toward the tongue 82. The gathered rod-shaped sheet 12 travels through the tongue 82, so that the rod-shaped sheet 12 is further reduced in diameter to a diameter smaller than or equal to that of the filler element 2, whereby the rod-shaped sheet 12 is shaped into the gathering rod 76.

Subsequently, the wrapping section 40 wraps the gathering rod 76 with the fed wrapping paper 16, so as to form the filler rod 78 (S5: wrapping step). Then, the cutting section 42 cuts the filler rod 78 into an intermediate rod 84 having a combined length of a plurality of filler elements 2 (S6: cutting step). Subsequently, the intermediate rod 84 is conveyed while the orientation thereof is changed by 90 degrees in a catcher drum 86 disposed in the conveyance path 44.

Figure 11:
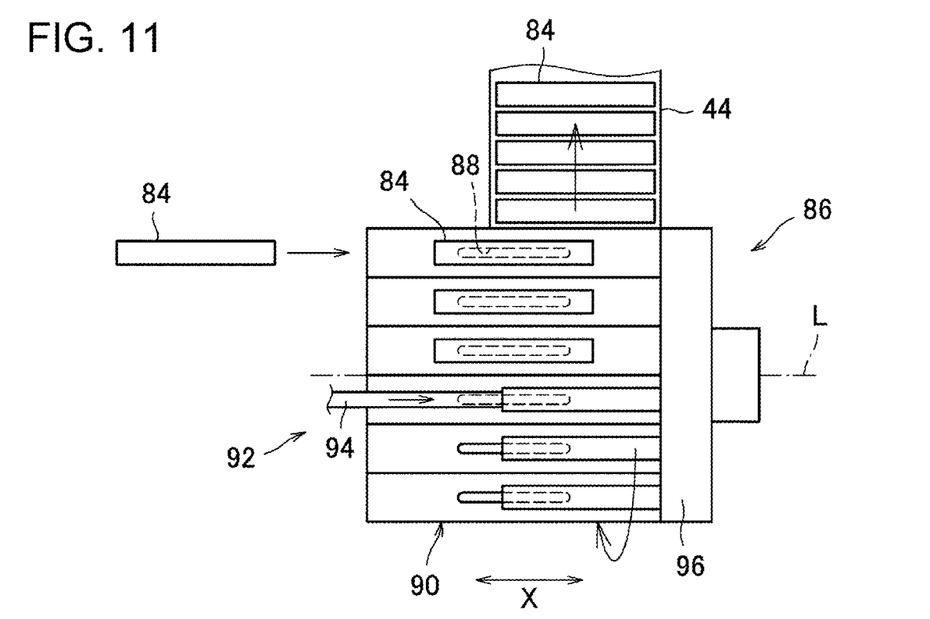
FIG. 11 is a top view of a catcher drum.

FIG. 11 illustrates a top view of the catcher drum 86. The catcher drum 86 has a drum shell 90 having a large number of suction grooves 88 provided in the circumferential direction. The drum shell 90 rotates about a rotation axis L. Each suction groove 88 extends along the rotation axis L in the outer peripheral surface of the drum shell 90. The intermediate rod 84 conveyed from the cutting section 42 is sequentially suctioned by the suction groove 88, is received by the drum shell 90, and is conveyed in the circumferential direction of the drum shell 90, as indicated by an arrow, in accordance with the rotation of the drum shell 90.

The catcher drum 86 includes a positioning mechanism 92 that positions the intermediate rod 84 suctioned in the suction groove 88 by causing the intermediate rod 84 to move along the rotation axis L. The positioning mechanism 92 includes a pusher 94 and a stopper guide 96. The pusher 94 is reciprocable along the rotation axis L, and the stopper guide 96 is provided at one end of the drum shell 90 along the rotation axis L. The pusher 94 causes the intermediate rod 84 to move along the rotation axis L against a suction force in the suction groove 88 until the intermediate rod 84 comes into contact with the stopper guide 96.

The intermediate rod 84 in contact with the stopper guide 96 is conveyed along the conveyance path 44, as indicated by an arrow, in an orientation where the axial direction X of the intermediate rod 84 is aligned with the width direction of the conveyance path 44. Subsequently, the intermediate rod 84 undergoes an attachment process with the flavor element 4, the tubular element 6, and the filter 8 that are separately manufactured, so as to become the filler element 2 constituting the article 1. Accordingly, the article 1 equipped with the filler element 2 is manufactured. In the positioning mechanism 92, the intermediate rod 84 may be moved by suction air instead of the pusher 94.

Accordingly, the manufacturing device 30 according to the embodiment includes the sheet processing section 34 and the addition section 36 in the conveyance path 44 of the sheet 12. In the crimping process P1 in the sheet processing step S2, the sheet processing section 34 forms the predetermined number of crimped parts 18 arranged in the width direction Y and extending in the longitudinal direction X. The addition section 36 has the feed portion 66 that continuously feeds the liquid additive onto the upper surface of the sheet 12 having the crimped parts 18 formed therein.

The feed portion 66 has the multiple nozzle 74 in which the large number of feed outlets 74a feeding the additive are arranged in the width direction Y. In the addition step S3, the feed portion 66 feeds the liquid additive continuously from the multiple nozzle 74 onto the upper surface of the sheet 12 having the crimped parts 18 formed therein and also feeds the liquid additive over the entire sheet 12 in the width direction Y. Accordingly, the liquid additive can be uniformly added to the filler element 2 without spilling, and contamination of equipment, such as the catcher drum 86, by the additive can be suppressed.

In addition to the crimped parts 18 being formed in the sheet 12, the filler material of the filler element 2 is the web-like sheet 12, such as a paper web or a nonwoven fabric, with small gaps between the fibers, instead of being acetate tow, whereby the filler element 2 to which a large amount of liquid additive can be added can be formed. In detail, the filler element 2 having added thereto an additive that is greater than or equal to 20 mg/cm$^3$ per unit volume of the filler rod 78 can be formed.

Figure 12:
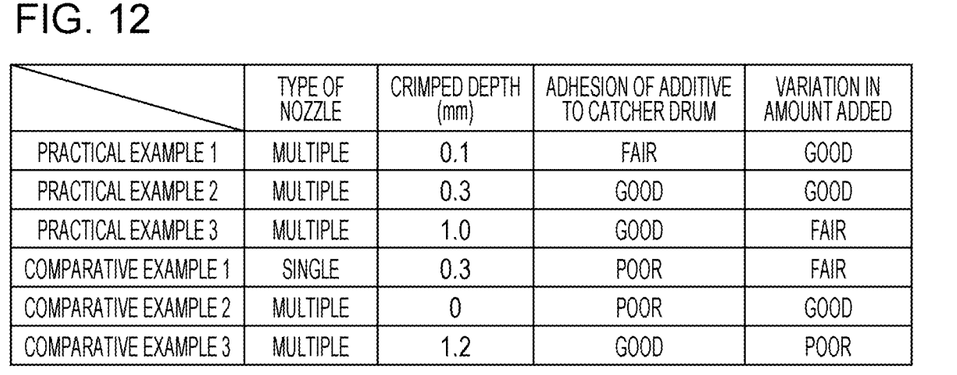
FIG. 12 illustrates test results of Practical Examples 1 to 3 for demonstrating the effects of an embodiment and test results of Comparative Examples 1 to 3.

FIG. 12 illustrates test results of Practical Examples 1 to 3 for demonstrating the effects of the embodiment and test results of Comparative Examples 1 to 3. The tests for obtaining the results of the practical examples and the comparative examples each involve causing the manufacturing device 30 to operate continuously for 60 minutes, and observing whether or not the additive has adhered particularly to the stopper guide 96 of the catcher drum 86 through which the intermediate rod 84 manufactured by the manufacturing device 30 subsequently travels. An end surface of the intermediate rod 84 comes into contact with the stopper guide 96 in accordance with movement of the pusher 94.

If the additive spills from the end surface of the intermediate rod 84 and adheres, and by extension accumulates, onto the stopper guide 96, the conveying of the intermediate rod 84 by the catcher drum 86 is hindered, thus causing a conveyance error to occur and causing the manufacturing device 30 to stop. Therefore, the spilling of the additive from the intermediate rod 84 is replaced with the stoppage of the manufacturing device 30 due to the adhesion of the additive particularly to the stopper guide 96 of the catcher drum 86. With regard to the evaluation index, a case where there is no stoppage of the manufacturing device 30 (no contamination) corresponds to "good", a case where there are one to three stoppages (contaminated) corresponds to "fair", and a case where there are four or more stoppages (highly contaminated) corresponds to "poor".

Furthermore, under preconditions in which the width (sheet width) of the sheet 12 in the width direction Y is 180 mm and the added amount of the additive is 450 mg/120 mm, the degree of variation in the amount of additive added per length of 120 mm of one intermediate rod 84 is checked. In detail, an average weight Wa of 50 intermediate rods 84 manufactured with the manufacturing device 30 is calculated, and the average weight Wa and a weight W of each intermediate rod 84 are compared.

With regard to the evaluation index in this case, a case where a ratio R of the weight W of each intermediate rod 84 to the average weight Wa is within a range of 95% to 105% (i.e., a small variation) for all the intermediate rods 84 corresponds to "good", a case where the ratio R is within a range of 93% to 107% for all the intermediate rods 84 (i.e., a relatively small variation) corresponds to "fair", and a case where the ratio R is outside the range of 93% to 107% for any one of the intermediate rods 84 (i.e., a large variation) corresponds to "poor".

Figure 13:
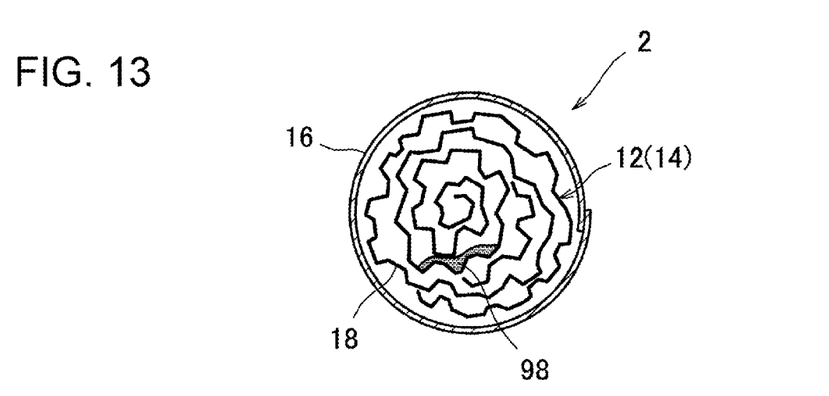
FIG. 13 is a vertical sectional view of an intermediate rod in the case of Comparative Example 1.

FIG. 13 illustrates a vertical sectional view of the intermediate rod 84 in the case of Comparative Example 1. In Comparative Example 1, the crimped depth of the crimped parts 18 is 0.3 mm, and the feed portion 66 has only one feed outlet 74a, that is, a so-called single nozzle. In this case, the manufacturing device 30 stops many times due to contamination of the catcher drum 86. As shown in FIG. 13, when a large amount of an additive 98 is locally added to the sheet 12 by the single nozzle, even if the sheet 12 is given a crimping treatment, the additive 98 exceeding the absorption limit is distributed to a part of the sheet 12, thus causing the additive to spill. Moreover, as the additive 98 spills, a relatively small variation occurs in the amount of the additive 98 added to each intermediate rod 84.

Figure 14:
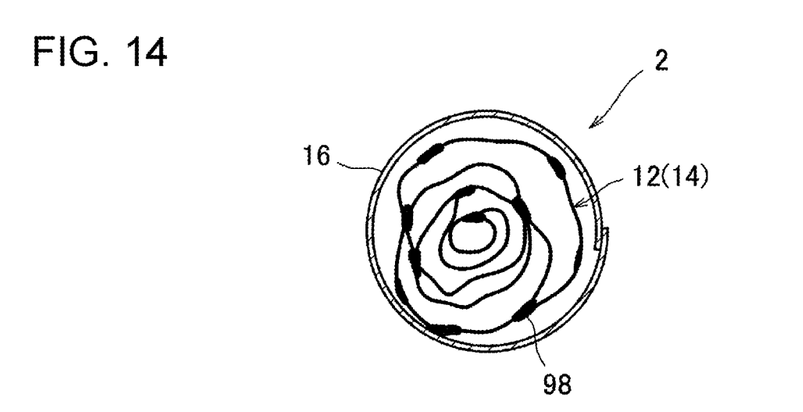
FIG. 14 is a vertical sectional view of the intermediate rod in the case of Comparative Example 2.

FIG. 14 illustrates a vertical sectional view of the intermediate rod 84 in the case of Comparative Example 2. In Comparative Example 2, the feed portion 66 has the multiple nozzle 74, but the sheet 12 is not given a crimping treatment. In this case, the additive spills from the intermediate rod 84, and the manufacturing device 30 stops many times due to contamination of the catcher drum 86. However, there is a small variation in the amount of additive added to each intermediate rod 84.

With the additive being dropped distributively by the multiple nozzle 74, the additive can be readily absorbed by the sheet 12, so that a variation in the amount of additive in the intermediate rod 84 is reduced. However, since the sheet 12 does not have the crimped parts 18, adjacent portions of the additive 98 bond with each other before the additive 98 dropped onto the sheet 12 is absorbed by the sheet 12, thus resulting in many areas where the additive is distributed unevenly and locally in the sheet 12, as shown in FIG. 14. As a result, the additive 98 exceeding the absorption limit is distributed throughout the sheet 12, thus causing the additive to spill.

Figure 15:
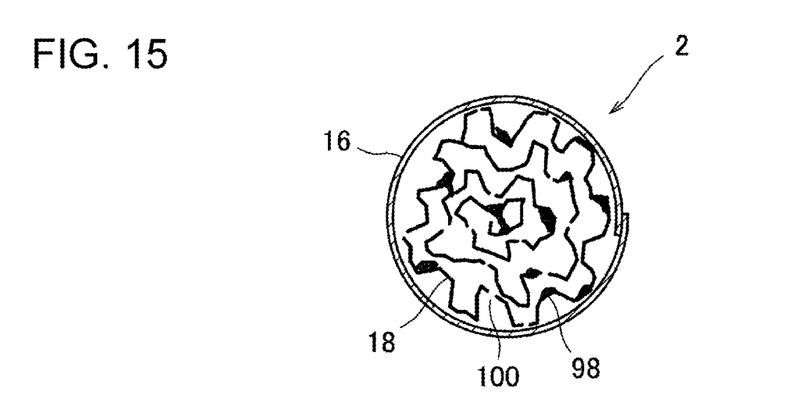
FIG. 15 is a vertical sectional view of the intermediate rod in the case of Comparative Example 3.

FIG. 15 illustrates a vertical sectional view of the intermediate rod 84 in the case of Comparative Example 3. In Comparative Example 3, the crimped depth of the crimped parts 18 is 1.2 mm, and the feed portion 66 has the multiple nozzle 74. In this case, the crimped parts 18 formed are deep, so that the additive is appropriately absorbed by the sheet 12, whereby the additive does not spill from the intermediate rod 84 to an extent that leads to a stoppage of the manufacturing device 30.

However, with the crimped depth being excessively large, a fracture 100 occurs in the sheet 12, as shown in FIG. 15, and the additive 98 falls through the fracture 100 before being absorbed by the sheet 12. Since the falling of the additive 98 causes uneven distribution of the additive 98 in the entire sheet 12, there is a large variation in the amount of additive added to each intermediate rod 84.

Figure 16:
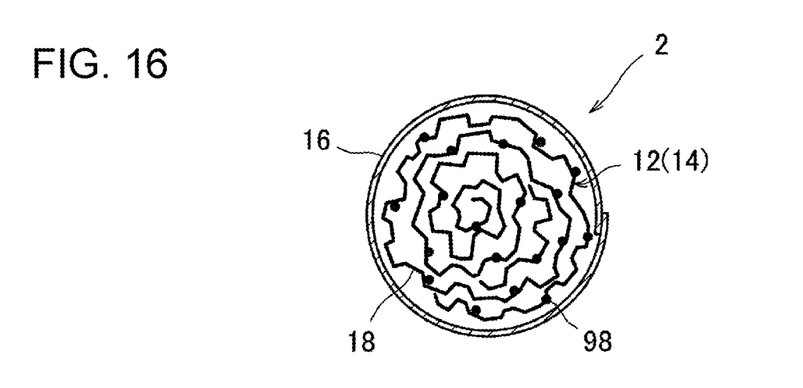
FIG. 16 is a vertical sectional view of the intermediate rod in the case of each of Practical Examples 1 to 3.

FIG. 16 illustrates a vertical sectional view of the intermediate rod 84 in the cases of Practical Examples 1 to 3. In each of Practical Examples 1 to 3, the feed portion 66 has the multiple nozzle 74. In Practical Example 1, the crimped parts 18 each have a crimped depth of 0.1 mm, which is small. Therefore, the absorbability of the additive into the sheet 12 slightly decreases, so that the additive slightly spills from the intermediate rod 84. However, there is a small variation in the amount of additive added to each intermediate rod 84.

In Practical Example 2, the crimped depth of the crimped parts 18 is 0.3 mm, the additive does not spill from the intermediate rod 84 to an extent that leads to a stoppage of the manufacturing device 30, and there is a small variation in the amount of additive added to each intermediate rod 84. In Practical Example 3, the crimped parts 18 each have a crimped depth of 1.0 mm, which is slightly large. Therefore, the additive does not spill from the intermediate rod 84 to an extent that leads to a stoppage of the manufacturing device 30. Moreover, since the crimped depth is not to an extent that causes the fracture 100 described in Comparative Example 3 to occur noticeably, there is a relatively small variation in the amount of additive added to each intermediate rod 84.

Accordingly, in the state where the crimped parts 18 are formed in the sheet 12, the additive is fed thereto by the multiple nozzle 74, so that the number of stoppages of the manufacturing device 30 due to contamination of the catcher drum 86 can be reduced, thereby enhancing the productivity of the filler element 2, and by extension the article 1. Moreover, a variation in the amount of additive contained in the intermediate rod 84, and by extension the filler element 2, can be reduced.

Therefore, the quality of the filler element 2, and by extension the article 1, can be improved, and uniform smoke taste of the article 1 can be achieved. In particular, in the case where the outer peripheral surfaces of the filler element 2 and the flavor element 4 are to be heated by the heater of the device, the additive is uniformly distributed not only to the inside of the filler element 2 but also to the outer periphery thereof, so that the component of the additive can be vaporized efficiently. Consequently, the smoke taste of the article 1 can also be improved.

Furthermore, when the above tests are performed, it is revealed that the thickness of the sheet 12 given the crimping treatment is preferably within a range larger than 0.03 mm and smaller than 1.5 mm, and more preferably within a range from 0.04 mm to 0.5 mm. When the thickness of the sheet 12 is 0.03 mm or smaller, the sheet 12 lacks strength and rips when being conveyed along the conveyance path 44, thus resulting in a conveyance error.

When the thickness of the sheet 12 is 1.5 mm or larger, the filling rate of the sheet filler section 14 becomes excessively high in the filler element 2 having a predetermined diameter, so that the sheet width needs to be reduced. In this case, since the surface area of the upper surface of the sheet 12 decreases, a large amount of additive cannot be added to the sheet 12. It is also revealed that the sheet width is preferably within a range larger than 50 mm and smaller than 300 mm, and more preferably within a range from 150 mm to 250 mm.

When the sheet width is 50 mm or smaller, the surface area of the upper surface of the sheet 12 decreases, so that a large amount of additive cannot be added to the sheet 12. When the sheet width is 300 mm or larger, the filling rate of the sheet filler section 14 shaped from the sheet 12 having the crimped parts 18 formed therein becomes excessively high in the filler element 2. Therefore, the ventilation resistance of the filler element 2 increases, thus resulting in a problem where the inhalation of the article 1 becomes difficult.

Although the embodiment has been described above, the above embodiment is not limited and permits various modifications within a scope not deviating from the spirit of the embodiment. For example, the engagement parts 58 of the roller set 46 may be formed by engagement between projections and depressions having shapes other than those of the protrusions 54 and the recesses 56. Accordingly, the area where the crimped parts 18 are formed in the sheet 12, the crimping pattern of the crimped parts 18, and the shape of the crimped parts 18 are not limited to those in the above embodiment, and various modifications are permitted. Consequently, the degree of freedom with respect to the crimping treatment on the sheet 12 increases, so that the absorbability of the additive into the sheet 12 can be further enhanced.

Furthermore, instead of randomly gathering the sheet 12 having added thereto the additive, a folding mechanism may be provided. Moreover, by adding the liquid additive, such as a flavor liquid, to the sheet 12, a flavor component derived from a tobacco plant can be vaporized not only from the flavor element 4 but also from the filler element 2. In other words, the filler element 2 using the sheet 12 formed of a tobacco-extract-containing paper web or nonwoven fabric may also have the function of the flavor element 4.

Figure 17:
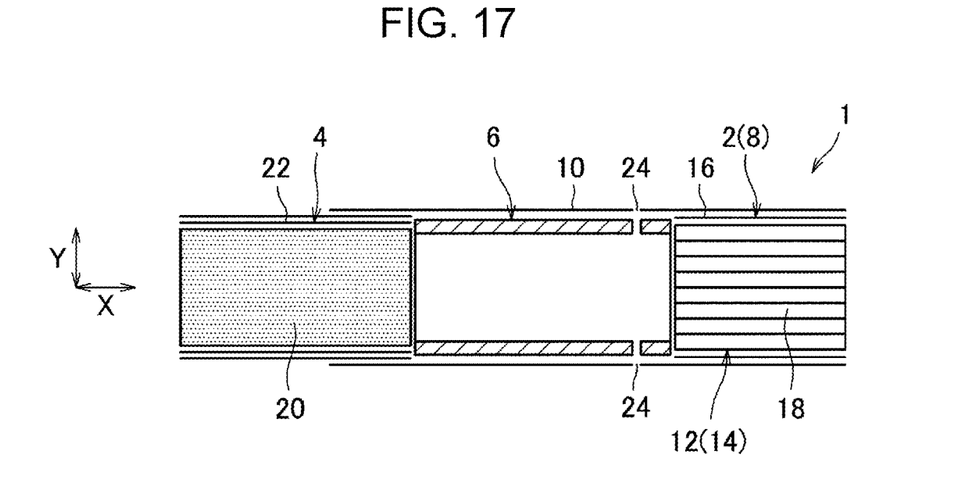
FIG. 17 is a cross-sectional view of a flavor inhalation article according to a modification.

Furthermore, a particulate or granular solid additive, such as activated charcoal or flavor particles, may be added to the sheet 12 after the liquid additive is added thereto. Accordingly, the filler element 2 can have the function of the flavor element 4 even more effectively. The configuration of the article 1 and the position and the number of filler elements 2 in the article 1 are not limited to those described above. In detail, as shown in FIG. 17, the filler element 2 may be disposed at the position of the filter 8 in FIG. 1 instead of being disposed at the distal end of the article 1 adjacent to the flavor element 4, so as to function as the filter 8.

Furthermore, filler elements 2 may be disposed both at the distal end of the article 1 adjacent to the flavor element 4 and at the position of the filter 8. Accordingly, the filler element 2 according to the embodiment can be used as various elements of the article 1, thereby implementing multiple variations of the article 1.

REFERENCE SIGNS LIST

1 flavor inhalation article
2 filler element
12 sheet (paper web, nonwoven fabric)
16 wrapping paper
18 crimped part
30 manufacturing device
34 sheet processing section
36 addition section
38 gathering section
40 wrapping section
42 cutting section
44 conveyance path
46 roller set
50 first roller
52 second roller
54 protrusion (projection)
56 recess (depression)
58 engagement part
60 engagement area
66 feed portion
74 multiple nozzle
74*a* feed outlet
76 gathering rod
78 filler rod
84 intermediate rod
X longitudinal direction
Y width direction

The invention claimed is:

1. A manufacturing method for a filler element used in a flavor inhalation article, the method comprising:
   processing a series of sheets while conveying each sheet along a conveyance path;
   feeding a liquid additive onto an upper surface of the sheet;
   forming a gathering rod during a conveying of the sheet along the conveyance path, the gathering rod being reduced in diameter by gathering the sheet, to which the liquid additive is added, in a width direction intersecting with a longitudinal direction of the sheet;
   wrapping the gathering rod with wrapping paper to form a filler rod; and
   cutting the filler rod into an intermediate rod having a combined length of a plurality of the filler element,
   wherein the processing includes forming a crimped part in the sheet during the conveying process of the sheet, the crimped part being arranged in the width direction and extending in the longitudinal direction, and
   wherein the feeding includes feeding the liquid additive continuously and dropwise onto the upper surface of the sheet, having the crimped part formed therein, entirely in the width direction of the sheet during the conveying of the sheet.

2. The manufacturing method for the filler element according to claim 1, wherein the feeding includes feeding the liquid additive that is greater than or equal to 20 mg/cm$^3$ per unit volume of the filler rod.

3. The manufacturing method for the filler element according to claim 1,
   wherein the processing includes using a first roller and a second roller to nip and convey the sheet along the conveyance path,
   wherein the first roller is provided with a projection protruding along a circumferential direction of an outer peripheral surface of the first roller,
   wherein the second roller is provided with a depression along a circumferential direction of an outer peripheral surface of the second roller, the depression engaging with the projection,
   wherein, to nip and convey the sheet, an engagement part where the projection and the depression engage with each other with the sheet interposed therebetween is formed, and a predetermined number of the engagement parts are formed in an area extending in the circumferential direction of each outer peripheral surface, and
   wherein the method further comprises giving a crimping treatment to an area extending in the longitudinal direction of the sheet to form a predetermined number of the crimped parts in the sheet, the predetermined number of the crimped parts corresponding to the number of the engagement parts.

4. The manufacturing method for the filler element according to claim 1, wherein the sheet is a paper web.

5. The manufacturing method for the filler element according to claim 1, wherein the sheet is a nonwoven fabric.

6. The manufacturing method for the filler element according to claim 1, wherein the liquid additive contains a flavor liquid.

7. The manufacturing method for the filler element according to claim 1, wherein the forming the crimped part causes a surface area of the sheet to increase.

8. The manufacturing method for the filler element according to claim 1, wherein the forming the crimped part causes fiber fuzzing of the sheet to occur.

9. The manufacturing method for the filler element according to claim 1, wherein the forming the crimped part includes forming the crimped part with a crimped depth of 0.3 mm or greater in the sheet.

* * * * *